United States Patent [19]

Kristof et al.

[11] Patent Number: 4,836,988
[45] Date of Patent: Jun. 6, 1989

[54] APPARATUS FOR REMOVAL OF NITROGEN OXIDES FROM FLUE GAS

[75] Inventors: Wolfgang Kristof, Trostberg; Claus Schlebener, Strasslach; Gerhard Linde, Gruenwald, all of Fed. Rep. of Germany

[73] Assignee: Linde Aktiengesellschaft, Wiesbaden, Fed. Rep. of Germany

[21] Appl. No.: 57,670

[22] Filed: Jun. 2, 1987

Related U.S. Application Data

[60] Continuation of Ser. No. 826,060, Feb. 4, 1986, abandoned, which is a division of Ser. No. 720,247, Apr. 5, 1985, Pat. No. 4,725,416.

[30] Foreign Application Priority Data

Apr. 5, 1984 [DE] Fed. Rep. of Germany ....... 3412870

[51] Int. Cl.$^4$ .............................................. B01J 8/04
[52] U.S. Cl. ................................... 422/171; 422/172; 422/175
[58] Field of Search ............................... 422/171–173, 422/175, 200, 191, 193; 65/48

[56] References Cited

U.S. PATENT DOCUMENTS

| | | | |
|---|---|---|---|
| 3,189,417 | 6/1965 | Houdry et al. | 422/175 |
| 3,190,730 | 6/1965 | Korwin et al. | 422/191 |
| 3,733,181 | 5/1973 | Turtellotte et al. | 422/174 |
| 3,879,944 | 4/1975 | Bertsch | 422/171 |
| 4,160,805 | 7/1979 | Inaba et al. | 422/173 |
| 4,186,171 | 1/1980 | Stoddard et al. | 422/200 |
| 4,246,235 | 1/1981 | Rogers | 422/173 |

Primary Examiner—Michael S. Marcus
Attorney, Agent, or Firm—Millen & White

[57] ABSTRACT

Apparatus for removal of deleterious gaseous components from a flue gas, the flue gas is cooled, optionally subjected to preliminary purification, and optionally depleted of $SO_2$. It is then heated in at least one heat exchanger and is passed over a catalyst suitable for the conversion of nitrogen oxides, whereupon the purified hot flue gas is conducted over at least one further heat exchanger and is discharged in the cooled state. Ammonia is preferably added to the heated flue gas.

2 Claims, 3 Drawing Sheets

APPARATUS FOR REMOVAL OF NITROGEN OXIDES FROM FLUE GAS

This application is a continuation of application Ser. No. 826,060, filed Feb. 4, 1986, abandoned, which is a divisional of Ser. No. 720,247 filed Apr. 5, 1985 now U.S. Pat. No. 4,725,416.

BACKGROUND OF THE INVENTION

This invention relates to apparatus for the removal of undesired gaseous components from a flue gas produced during a combustion process, wherein the flue gas is cooled, optionally subject to preliminary purification and optionally depleted of $SO_2$.

The problem of the removal of deleterious gaseous components from combustion gases has gained increasing importance. These combustion or flue gases are usually produced by air combustion of hydrogen or carbonaceous fuels, such as oil, coal or natural gas. The removal of any sulfur compounds present, particularly sulfur dioxide, can be advantageously effected with a physical absorbent, after cooling and —if necessary— preliminary purification (especially dust and soot separation and optionally removal of HF and HCl). In this process, almost the entire sulfur dioxide originally contained in the flue gas is scrubbed out. Such a method has been described, for example, in DOS No. 2,848,721 or DOS No. 3,237,387.

This conventional process, however, removes only sulfur dioxide. In many instances, however, flue gas contains other components which must not pass into the atmosphere, such as nitrogen oxides in particular.

For the removal of nitrogen oxides, catalytic processes are known wherein $NO_2$ or $NO$ is reduced in the presence of ammonia in accordance with the following reactions:

or

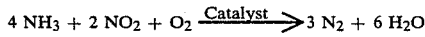

at high temperatures of between about 300° and 450° C. to $N_2$ and water which may be safely exhausted into the atmosphere.

In this NO reducing process the catalyst is conventionally arranged in the hot crude flue gas stream before H$_2$electric precipitator and before the $SO_2$removal process, i.e. the stream having a high dust content, and/or a high $SO_2$ and $SO_3$ content.

In order to free the above gas of $NO_x$, there are employed honeycomb-shaped catalyst beds housed in containers. The operation in the presence of contaminants, however, results in a relatively brief lifetime of the catalyst. Moreover, another disadvantage of the conventional process for removal of $NO_x$ resides in that in case of peak load, the amount of $NH_3$ to be added is very dificult to control since, with a change in the amount of flue gas, the temperature in the catalyst bed fluctuates as well, and catalyst selctivity is very sensitive to temperature changes.

SUMMARY OF THE INVENTION

An object of the present invention therefore, is to provide an improved apparatus for the removal of deleterious components from flue gas.

Another object is to provide a system avoiding the above-discussed disadvantage of conventional system while simultaneously lowering energy requirements.

Upon further study of the specification and appended claims, further objects and advantages of this invention will become apparent to those skilled in the art.

DETAILED DISCUSSION

To attain these objects the pretreated flue gas is heated in at least one heat exchanger and is conducted over a catalyst suitable for the conversion of nitrogen oxides, whereupon the thus-purified, hot flue gas is passed over at least one further heat exchanger and is discharged in the cooled state.

Catalysts utilized for the conversion of nitrogen oxides show an increased operating life if impurities such as $SO_2$, $SO_3$, HCl, HF, dust and soot are substantially removed beforehand. This is accomplished in the process of this invention wherein these impurities —if present—are separated from the flue gas, whereupon the latter is subjected to $NO_x$ separation.

Since the $SO_2$ separation that may be required takes place ordinarily at temperatures lying substantially below those necessary for the catalytic $NO_x$ conversion, the flue gas must be heated. This heating step is conducted according to this invention in heat exchangers which are heated by the hot, $NO_x$-free flue gas and which, in turn, transfer this heat to the $NO_x$-containing flue gas to be heated. In this way, without expending any large amount of energy, an adequate heating of the flue gas can be ensured. In an advantageous embodiment, the flue gas after having been heated in the heat exchanger, is combined wtih $NH_3$ before the catalytic reaction.

In this connection, it is advantageous if the heat exchangers are regenerators. Such heat exchangers can be cyclically reversed in a preferred operation. This means that the reacted hot flue gas is cooled in a heat exchanger which in a preceding switching cycle, was traversed by an entering cool flue gas; in any case, when the hot flue gas is cooled the regenerator mass is reheated. Accordingly, besides using conventional, tube-type heat exchangers, it is also possible to employ heat exchangers with packings, such as, for example, regenerators or rotating gas preheaters. As is known, a regenerator is traversed by a hot gas which transfers its heat content to the regenerator mass, such as, e.g., packing. After a certain period of time, the regenerator is switched over. Gases are then blown into the regenerator from the cold end to absorb the heat accumulated in the regenerator. In gas preheaters, the heat-exchanger elements are made up of compartments built from smooth metal sheets within which the regenerator packing is arranged. The latter, similarly as in the regenerators, is traversed alternatingly by a hot gas and a cold gas.

In this connection, it is especially advantageous to use a ceramic composition as the regenerator mass, ensuring a maximally complete heat exchange. This ceramic composition cna also be used in this process at least in part as the catalyst, examples of such ceramics being each catalyst, of which the active component is put on a carrier on the basis of aluminia oxide or silicon oxide or a mixture of aluminia oxide and silicon oxide.

The hot flue gas is then conducted over the catalyst so that the above-mentioned reactions can take place. In this connection, the first-mentioned reaction will occur in particular since the flue gas contains in most cases above 90% NO, the remainder being $NO_2$. The $N_2$ and steam produced during the catalytic conversion are harmless and can be safely exhausted into the atmosphere.

The hot purified gas then transfers its heat to a heat exchanger utilized in a preceding cycle for heating $NO_x$-containing flue gas so that this heat exchanger will be available again, in a further cycle, for heating the flue gas. According to a preferred embodiment, the flue gas stream is switched over to the other heat exchanger after a time of about 1-20 minutes, preferably 3-5 minutes.

According to an especially advantageous embodiment of the process of this invention, a catalyst bed is used which is subdivided into several layers. This will be utilized, in particular, if in cramped space situations the required surface area for the catalyst with a given velocity per unit volume and linear velocity is unavailable. In this case, the utilization of several catalyst layers according to this invention enlarges the cross-sectional area available for the incoming flow, i.e. the surface of the bed, since the sum total of the surface areas of the individual layers is larger than the cross-sectional area of the flow path. The catalyst layers can be arranged in series and/or side-by-side relationship. With a series arrangement, it is advantageous to have the catalyst layers overlap one another at least partially. In this system, the catalyst layers are disposed at mutual spacings in different planes perpendicularly to the throughflow direction of the flue gas, wherein at least sections of the catalyst layers are congruent to one another.

In this connection, it is advantageous for the flue gas stream to be passed successively through the catalyst layers. However, there is also the additional possibility of subdividing the flue gas stream into partial streams fed separately from one another to the catalyst layers. This means that the flue gas can be subdivided into parallel streams and conducted over the catalyst layers, but it can also be conducted in succession over the layers.

According to another advantageous embodiment of this invention, the direction of flow in the heat exchanger, on the catalyst or between heat exchanger and catalyst can be altered. In this way, the heat exchanger and/or the catalyst can be traversed by the gas horizontally as well as vertically.

Thus several alternatives exist for conducting the process: The flue gas, after passing through the heat exchanger, can flow through the catalyst (the catalyst layers) in succession and can be conducted back to the heat exchanger and discharged; or it can be passed over a second heat exchanger and discharged; or it can be conducted over a second catalyst (second catalyst layers) and a second heat exchanger, and discharged. The flue gas can also pass, after traversing the heat exchanger, catalyst layers in parallel partial streams and can then be further conducted and discharged as mentioned above.

It proved to be especially advantageous, in this connection, to arrange the catalyst (catalyst layers) and the heat exchangers so that the catalyst is located below the heat exchangers, so as to be accessible, thereby facilitating servicing.

The process of this invention offers the advantage that a catalyst can be utilized with an optimally selectable reaction temperature, the lifetime of this catalyst being prolonged since there are no longer any deleterious contaminants in the gaseous stream. In case of load fluctuations, the feeding of $NH_3$ can be regulated more advantageously as compared with the conventional method since here the effect of the temperature can be minimized.

Conventional catalysts are utilized for the conversion of nitrogen oxides, such as, for example, zeolites or vanadium oxide/titanium oxide on a support, or noble metal catalyts on a support. Depending on the catalyst employed, the flue gas is heated to the temperature required for reaction on the catalyst. This temperature ranges preferably between 250° and 400° C. These temperatures are adequate since the catalyst does not lose any of its activity due to other impurities. In this process, the flue gas, which is reduced in its $SO_2$ content, can be heated for example in heat exchange with flue gas to be cooled, to 250° to 400° C.

The heat losses in case of incomplete heat exchange are compensated by any heat source. In this context, hot flue gas, in particular, is utilized as the source of heat. The flue gas can be produced, for example, by the combustion of high-caloric fuels in a combustion chamber and can be supplied from the outside, or it can be produced directly by combustion of high-caloric fuels within the reactor. In this case, a small amount of flue gas is in most instances sufficient to cover the losses. The heat losses can, of course, also be covered by other heat sources, such as electric heating or by steam condensing in a heat exchanger. In this connection, it is possible to supply heat on one side as well as on both sides of the catalyst bed. It is moreover feasible to withdraw at least a partial stream of the flue gas from the reactor before being passed over the catalyst by means of a discharge conduit, which can be heated conventionally, and recycling the resultant heated flue gas to the reactor, especially the catalyst bed.

The apparatus for conducting the process comprises a catalyst bed and at least one heat exchanger connected upstream of the catalyst bed and at least one further heat exchanger connected downstream of the catalyst bed. This results in the following structure: a flue gas inlet is connected with at least one first heat exchanger, and the latter is in communication with the catalyst bed. A gas discharge conduit is connected to the catalyst bed and is in communication with at least one further heat exchanger.

As is furthermore proposed, it is especially advantageous if the catalyst bed is connected to a feed conduit for $NH_3$.

In an extremely advantageous embodiment of the apparatus of this invention, the catalyst bed is subdivided into several layers. These layers are advantageously arranged horizontally; in the flow direction of the flue gas, several layers can be arranged in series as well as in side-by-side relationship. Accordingly, there is the possibility, on the one hand, to arrange a portion of the layers in superimposed relationship, offset stepwise with respect to one another, and it is also contemplated, on the other hand, to arrange the layers in superimposed relationship so that they are congruent to one another.

Advantageously, the heat exchanger has a ceramic regenerator mass which can be designed at least in part as the catalyst packing. In is especially advantageous for the heat exchanger to be designed as a regenerator.

According to a further embodiment of the apparatus of this invention, the catalyst bed is disposed at the hot end of the regenerator. Here, the catalyst bed and the regenerator mass can be arranged in a double-flow regenerator. The catalyst bed and the heat exchanger are herein considered to be a single system. In the double-flow regenerator, two such systems are arranged in such a way that the heat exchangers are provided respectively at the upper and lower sections whereas the catalyst beds are located in the central section of the regenerator. Suitably, a partition is disposed between the two systems. This arrangement saves foundation surface area as well as expensive piping.

Alternatively, and in a preferred embodiment, the heat exchangers are disposed in series and the catalyst bed is arranged in between the heat exchangers. In this embodiment, the flue gas is thus introduced into a heat exchanger, then conducted over the catalyst bed and through the second heat exchanger. In the next cycle, the flue gas is first passed over the last-traversed regenerator, then over the catalyst, and finally the now second heat exchanger.

in an especially advantageous fashion, the two heat exchangers and the catalyst bed are disposed in a single vessel with a preferably rectangular basal surface area.

In the above-described embodiment, the catalyst bed is traversed in two successive cycles in differing directions. However, it proves to be frequently more advantageous to subject the catalyst bed to a flow that is always in one direction. For this purpose, the provision is made according to this invention that means are disposed between the heat exchangers and the catalyst, serving for the purpose of switching over the flow direction of the flue gas. Accordingly, the flue gas will be guided, by means of the switching means, for example a four-way flapper valve, independently of the regenerator in which it was heated, in all cases so that it will always flow through the catalyst in only a single direction. In this arrangement, heating of the catalyst from one side is advantageous.

It is furthermore advantageous in the arrangement of this invention to provide, in the gas feed conduit, a device for reversing the flow direction; this device can be designed, for example, likewise as a four-way flapper valve. This device serves for switching over the flue gas to be heated to the respective heat exchanger.

The process of this invention and the associated apparatus can be used in a general way in all flue gas purification installations.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DESCRIPTION OF THE DRAWINGS

Figure 1:
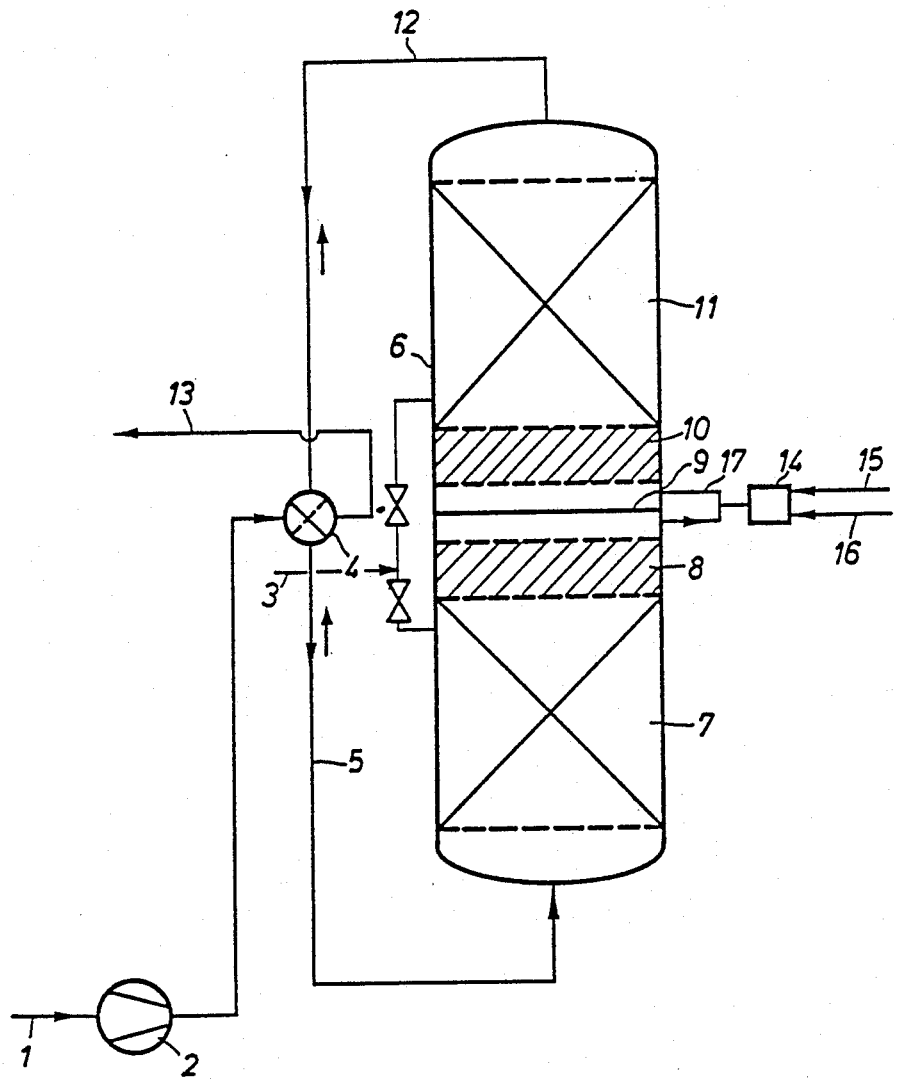
FIG. 1 shows a double-flow regenerator-reactor with two catalyst beds.

According to FIG. 1, 213,000 Nm h of a flue gas is introduced via conduit 1 and compressed in a blower 2 to about 1.6 bar. The flue gas does not contain any dust, soot, HF and/or HCl. (It was subjected to preliminary purification in an upstream facility, or it was devoid of these components from the beginning.) It was also treated to remove $SO_2$ and $SO_3$. The flue gas has a temperature of about 30° C.; it still contains about 500 vppm NO. (vppm = parts by volume per million)

The compressed flue gas is conducted into a reactor 6 via a conduit 5 by means of a four-way flapper valve 4.

The reactor 6 is designed as a double-flow regenerator. It comprises a lower regenerator packing 7 with a catalyst bed 8 arranged thereabove, a partition 9, as well as another catalyst bed 10, and a regenerator packing 11. Ceramic packing material is utilized, for example, as the regenerator packing.

In this embodiment, the $NO_x$-containing flue gas is passed to the regenerator packing 7 and heater therein to a temperature of 300° C. Prior to being passed to the catalyst packing, the heated flue gas is combined, via conduit 3, with $NH_3$ stoichiometrically in a ratio of about 1:1 (based on NO). The mixture is then passed over the catalyst bed 8 and is converted into $N_2$ and water to an extent of 90%, so that there is still about 28 vppm of NO in the purified gas. This value however, is well below the legally permissible value for the maximum discharge of nitrogen oxides into the atmosphere.

The purified gas then passes into the other system which, in a preceding switching cycle, had been subjected to flue gas. After flowing through the catalyst bed 10, the hot purified gas transfers its heat content to the cold regenerator packing 11 and leaves the regenerator 6 via conduit 12 with a temperature of about 40° C. The gas is discharged through conduit 13 via the four-way valve 4. After a period of about 4 minutes, the four-way flapper 4 switches over in such a way that the flue gas to be purified enters the reactor 6 by way of conduit 12 and is withdrawn via conduit 5. This possibility is indicated by the additional arrows.

In order to compensate for heat losses in the reactor, a burner 14 is provided, supplied via conduits 15, 16 with, for example, natural gas and air, producing a flue gas which can be conducted via conduit 17 to the regenerator packing to heat same to the required temperatures.

Figure 2:
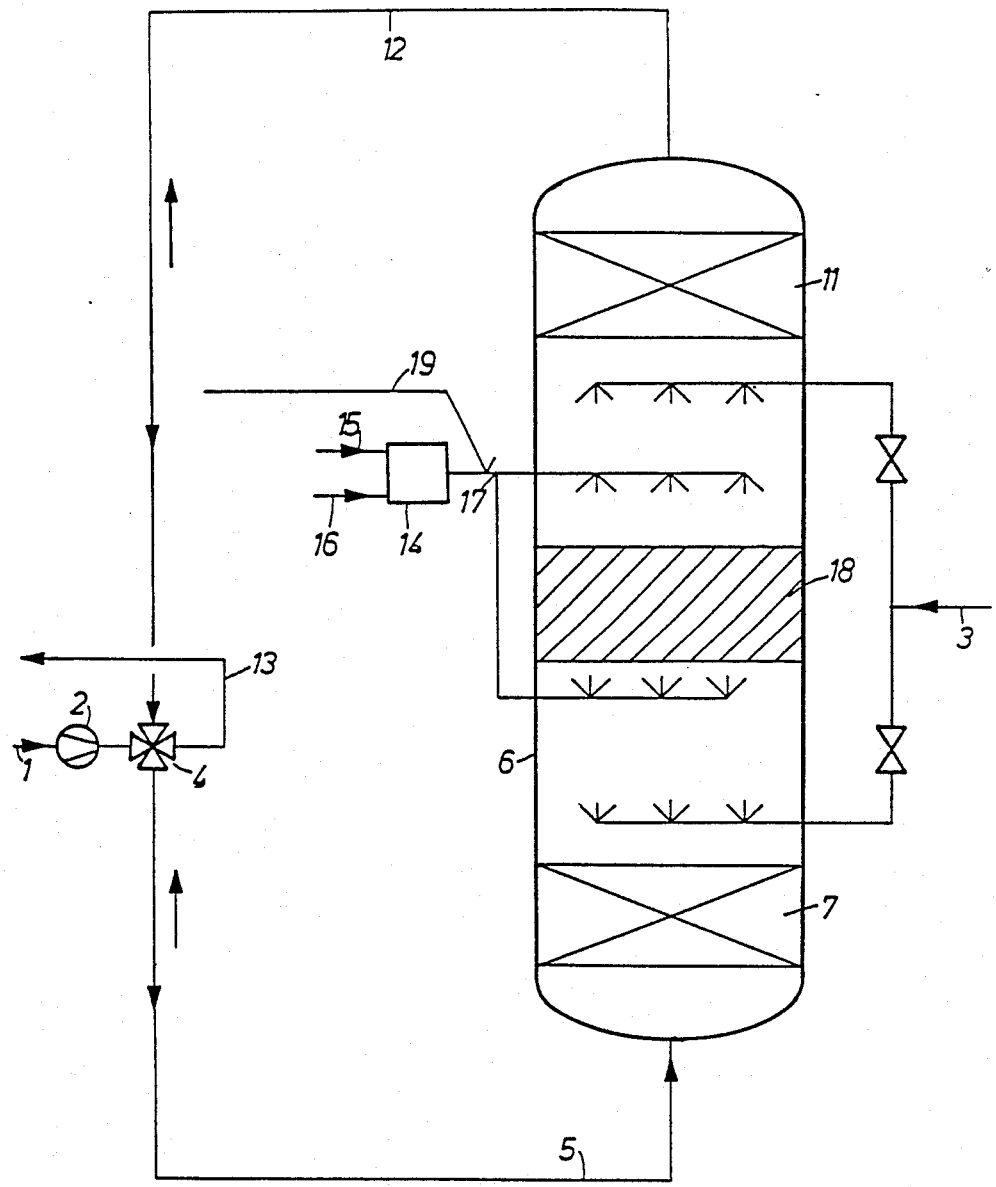
FIG. 2 shows a double-flow regenerator-reactor with one catalyst bed.

In the embodiment of FIG. 2, parts that are the same as in FIG. 1 are denoted by identical reference numerals.

As contrasted to the embodiment of FIG. 1, the reactor 6 of FIG. 2 has one catalyst bed 18. Moreover, hot crude gas via conduit 19 can be utilized to cover heat losses.

Also in this embodiment, the $NO_x$-containing flue gas is supplied to the regenerator packing 7, for example a ceramic packing, and is heated to about 300° C. After feeding $NH_3$ via conduit 3, the gas passes over the catalyst bed 18 and is converted to $N_2$ and water so that the purified gas contains still about 28 vppm of NO.

The thus-purified gas passes thereafter over the cold regenerator packing 11, transfers its heat content at that point, and leaves the regenerator via conduit 12 at a temperature of about 40° C. The gas is discharged via the four-way valve 4 by way of conduit 13.

Here again, the four-way valve 4 will switchover, after a time period of about 4 minutes, so that the flue gas to be purified passes into the reactor 6 via conduit 12 and is discharged via conduit 5. This possibilitly is indicated by additional arrows in the Figure.

The entire amount of energy expended for the process of this invention is composed of the energy requirement for the flue gas blow of about 500 kW/h and the energy requirement for the additional heating of the regenerator packing of about 1.4 Gcal/h so that the total energy expenditure is consierably less than that of conventional processes.

Figure 3:
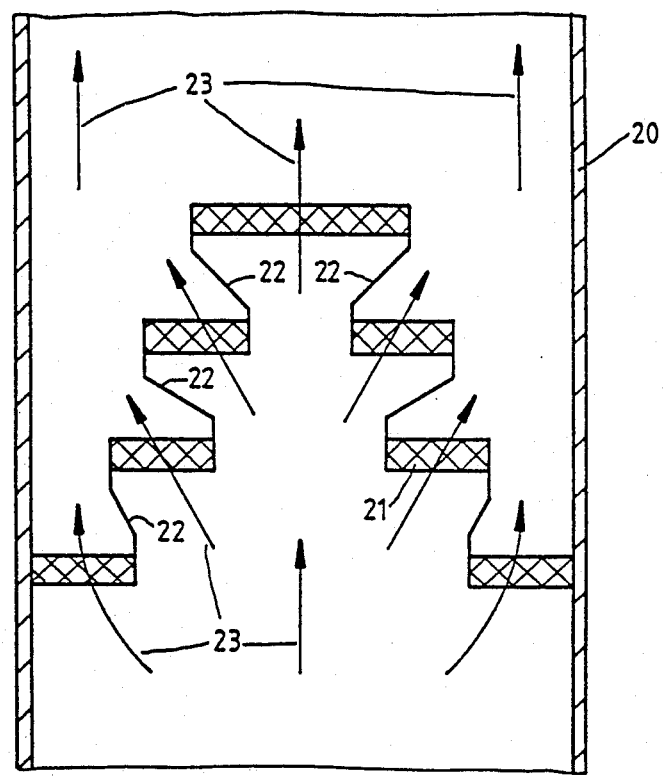
FIG. 3 shows a preferred embodiment of the catalyst bed in a schematic cross-sectional view.

FIG. 3 illustrates a flow path 20 wherein horizontal catalyst beds 21 are arranged in a staggered pattern, these beds overlapping one another partially as seen in the flow direction. The flue gas stream to be treated is indicated by arrows 23. This arrangement represents a preferred embodiment of the catalyst bed according to FIGS. 1 and 2. The catalyst layer scan be composed as bulky packing, i.e., the catalyst mass can be designed in a particulate shape, for example in ring or stellate configuration. There is also the possibility of utilizing honeycomb-shaped catalysts.

Gas impermeable partitions 22 are provided between the catalyst layers 21, these partitions extending from the inner edge of one catalyst layer to the outer edge of the next-higher catalyst layer. The catalyst layers 21 as well as the partitions 22 are disposed symmetrically to the central axis of the flow path 20. The sum total of the surface area of the catalyst layers is thereby larger than the cross-sectional area of the flow path 20.

To avoid adversely affecting the catalyst, the flue gas to be treated by the present invention for the removal of nitrogen oxide must have a concentration of impurities less than

| Impurity | General Maximum | Preferred Maximum |
|---|---|---|
| $SO_2$ vppm | 300 | 100 |
| $SO_3$ vppm | 20 | 10 |
| HCl vppm | 100 | 10 |
| HF vppm | 20 | 10 |
| Solids (Soot and Dust)* | 50 | 30 |

*in $mg/m^3$ (standard condition)

If these impurities exceed the general maximum, then the preliminary purification processes must be used.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Apparatus suitable for removing nitrogen oxides from flue gas flowing in a selected direction wherein the flue gas has been previously purged of deleterious components with the exception of nitrogen oxide, the apparatus comprising: a housing, contained within said housing at least one catalyst bed subdivided into several layers and first and second heat exchangers, each heat exchanger containing a ceramic regenerating mass, the catalyst bed being disposed between the first and second heat exchangers; the several layers of the catalyst bed being spaced apart from one another in the direction of flow of the flue gas and laterally overlapping one another, the layers being held in spaced relationship by gas impermeable plates, means for directing the flue gas to flow in a stream in a direction passing first through one of the heat exchangers, through the catalyst bed and then through the other heat exchanger; conduit means having first and second outlets positioned between the catalyst bed and first heat exchanger and catalyst bed and second heat exchanger, respectively for feeding $NH_3$ to the stream of flue gas, valve means for periodically reversing the direction of flow of the flue gas from a first direction in which the flue gas flows first through the first heat exchanger to a second direction opposite the first direction in which the flue gas flows first through the second heat exchanger, valve means in the conduit means for opening the first outlet and closing the second outlet and for closing the first outlet and opening the second outlet so that the $NH_3$ is fed into the stream upstream of the catalyst bed, and means for supplying supplemental heat to the reactor downstream of that heat exchanger through which the stream of flue gas first passes as the flue gas flows in one direction, whereby after the flue gas has heated the first heat exchanger and cooled the second heat exchanger, the flue gas heats the second heat exchanger and cools the first heat exchanger.

2. Apparatus suitable for removing nitrogen oxide from of flue gas flowing in a selected direction wherein the flue gas has been previously purged of deleterious components with the exception of nitrogen oxide, the apparatus comprising: a housing, contained within said housing at least one catalyst bed subdivided into several layers and first and second heat exchangers, each heat exchanger containing a ceramic regenerating mass, the catalyst bed being disposed between the first and second heat exchangers; means for directing the flue gas to flow in a stream in a direction passing first through one of the heat exchangers, through the catalyst bed and then through the other heat exchanger; conduit means having first and second outlets positioned between the catalyst bed and first heat exchanger and catalyst bed and second heat exchanger, respectively, for feeding $NH_3$ to the stream of flue gas upstream of the catalyst bed; valve means for periodically reversing the direction of flow of the flue gas from a first direction to a second direction opposite the first direction which the flue gas flows first through the second heat exchanger, valve means in the conduit means for opening the first outlet and closing the second outlet and for closing the first outlet and opening the second outlet so that the $NH_3$ is fed into the stream upstream of the catalyst bed, and means for supplying supplemental heat to the reactor downstream of that heat exchanger through which the stream of flue gas first passes as the flue gas flows in one direction, whereby after the flue gas has heated the first heat exchanger and cooled the second heat exchanger, the flue gas heats the second heat exchanger and cools the first heat exchanger.

* * * * *